United States Patent
Shin

(10) Patent No.: US 6,215,953 B1
(45) Date of Patent: Apr. 10, 2001

(54) DUPLICATION APPARATUS HAVING AUTOMATIC SELECT FUNCTION OF COPY MODE

(75) Inventor: Ik-Kyung Shin, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/059,414

(22) Filed: Apr. 14, 1998

(30) Foreign Application Priority Data

Apr. 14, 1997 (KR) .................................................. 97-13573

(51) Int. Cl.[7] .............................. H04N 5/76; H04N 5/92
(52) U.S. Cl. .................................................. 386/94; 386/95
(58) Field of Search .................................. 386/94, 95, 46, 386/1, 52, 4; 380/5, 10, 7, 3, 11, 15; 360/60, 13, 15; H04N 5/76, 5/92

(56) References Cited

U.S. PATENT DOCUMENTS 5,627,655 * 5/1997 Okamoto et al. ...................... 386/94
5,907,443 * 5/1999 Hirata ..................................... 360/60
5,982,977 * 11/1999 Naruse et al. ......................... 386/64

* cited by examiner

*Primary Examiner*—Robert Chevalier
(74) *Attorney, Agent, or Firm*—Sughrue, Mion, Zinn, Macpeak & Seas, PLLC

(57) ABSTRACT

The present invention relates to a duplication apparatus which detects the quality of a signal recorded on a source recording medium to select a copy mode that is appropriate for the detected result, and duplicates the recorded signal of the source recording medium to a target recording medium to be a duplication object, thereby making the apparatus easier to use.

6 Claims, 3 Drawing Sheets

3.4MHz 4.4MHz 5.4MHz 7MHz

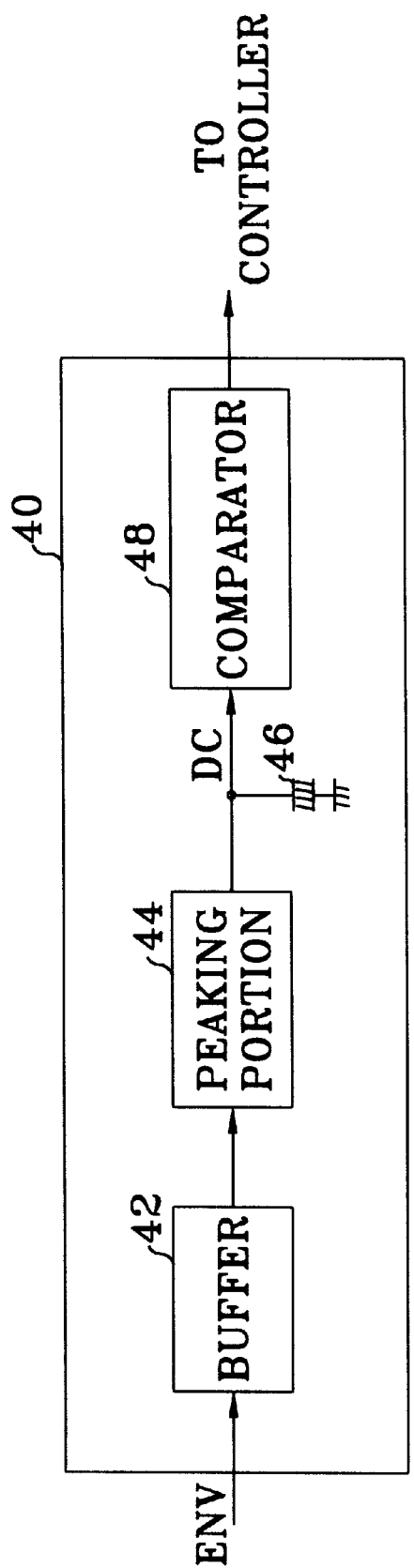

DUPLICATION APPARATUS HAVING AUTOMATIC SELECT FUNCTION OF COPY MODE

BACKGROUND OF THE INVENTION

The present invention relates to a duplication apparatus, and more particularly, to a duplication apparatus which automatically selects a copy mode being appropriate for the quality of a signal recorded on a source recording medium, to record the recorded signal of the source recording medium on a recording medium to be a duplication object.

As an example of a duplication apparatus, there is a dual deck VCR which includes two decks. The two decks can perform recording and playback, respectively. In this case, when tape is duplicated, information of a source tape reproduced from one deck is recorded on a blank tape loaded in the other deck. There are two types of duplication methods in case of a dual deck VCR, in which one is a first copy method (hereinafter referred to as a signal copy) for recording a final output which is played back from a deck set and displayed on a screen, that is, a signal which is frequency-modulated and demodulated again, and the other is a second copy method (hereinafter an frequency modulation (FM) copy) for recording an envelope signal which is picked up via a preamplifier. The signal copy method and an FM copy method can be selected on a menu screen by a user.

FIGS. 1A and 1B are graphical views for comparing and illustrating FM bands of a high-quality (hereinafter referred to as Super-VHS or S-VHS tape) and a normal tape (hereinafter referred to as Normal-VHS or N-VHS). Here, a horizontal axis represents a frequency (f), and a vertical axis represents a gain. The S-VHS tape is different from the N-VHS tape in the case of the FM band on which the essential information is loaded. In FIG. 1A, a graph "A" represents a low-band converted carrier color signal, and a graph "B" represents an FM modulated luminance signal. A hatched portion of the FM modulated luminance signal "B" represents an FM carrier frequency deviation. The FM carrier frequency deviation (hatched portion) of the N-VHS is between 3.4 MHz and 4.4 MHz as shown in FIG. 1A, and the FM carrier frequency deviation (hatched portion) of the S-VHS is between 5.4 MHz and 7 MHz as shown in FIG. 1B. The FM carrier frequency deviation on which the essential information is loaded is higher in the S-VHS than in the N-VHS. Accordingly, the S-VHS can be recorded and reproduced only via a high-definition VCR that is called a super VCR, and cannot be recorded and reproduced in a general VCR.

Therefore, a high-definition signal amplifier should be additionally provided in order to reproduce high-definition information from a tape in a general VCR. The high-definition signal amplifier amplifies a high-band portion on which the FM carrier frequency of the S-VHS is loaded, to thereby enable the high-definition signal to be reproduced. However, as shown in FIGS. 1A and 1B, since the FM signal band of the S-VHS on which the essential information is loaded is much different from that of the N-VHS, a high-band signal of a copied FM signal cannot be restored during reproduction. In other words, when a source tape is an S-VHS tape, signals can be recorded on an N-VHS tape, but the recorded signals cannot be restored on a screen. When a thus-recorded tape is played back, an image is processed as black on the screen. However, a signal copy which duplicates the final output from the deck set as it is, causes degradation of a picture quality but enables picture reproduction.

Thus, if a copy mode of the dual deck VCR is currently set to a signal copy mode, the information recorded on the S-VHS tape can be duplicated and reproduced. However, if a copy mode of the dual deck VCR is set to an FM copy mode, the information recorded on the S-VHS tape can be duplicated but cannot be reproduced.

If a user recognizes a copy mode according to the picture quality of a tape as described above, a copy mode may be manually set considering the picture quality of the tape. However, if a user does not know a copy mode, the user feels inconvenience in use of the VCR and may request an unnecessary after-service. Such a problem frequently occurs when a duplication operation is performed between recording mediums providing different qualities.

SUMMARY OF THE INVENTION

To solve the above problems, it is an object of the present invention to provide a duplication apparatus which discriminates the quality of a signal recorded on a source recording medium to select a copy mode being appropriate for the discriminated result, and duplicates the recorded signal of the source recording medium to a target recording medium to be a duplication object.

To accomplish the above object of the present invention, there is provided a duplication apparatus comprising:

a reproduction unit for reproducing a first signal recorded on a loaded first recording medium and signal-processing a reproduced first signal, to thereby output the reproduced first signal and a second signal obtained via signal-processing of the first signal; a recording unit for selecting one of the first signal and the second signal output from the reproduction unit, and recording the selected signal on a loaded second recording medium; and a control unit for controlling a selecting operation of the recording unit based on the second signal output from the reproduction unit, the control unit controls the recording unit so that the first signal is recorded on the second recording medium when a signal of a first mode is recorded on the first recording medium, and so that the second signal is recorded on the second recording medium when a signal of a second mode is recorded on the first recording medium.

BRIEF DESCRIPTION OF THE DRAWINGS

The preferred embodiment is described with reference to the drawings wherein:

FIG. 3 is a detailed block diagram showing a high picture quality discriminator in the apparatus of FIG. 2.

DETAILED DESCRIPTION OF THE PREFERRED EMBODIMENT

Figure 1A:
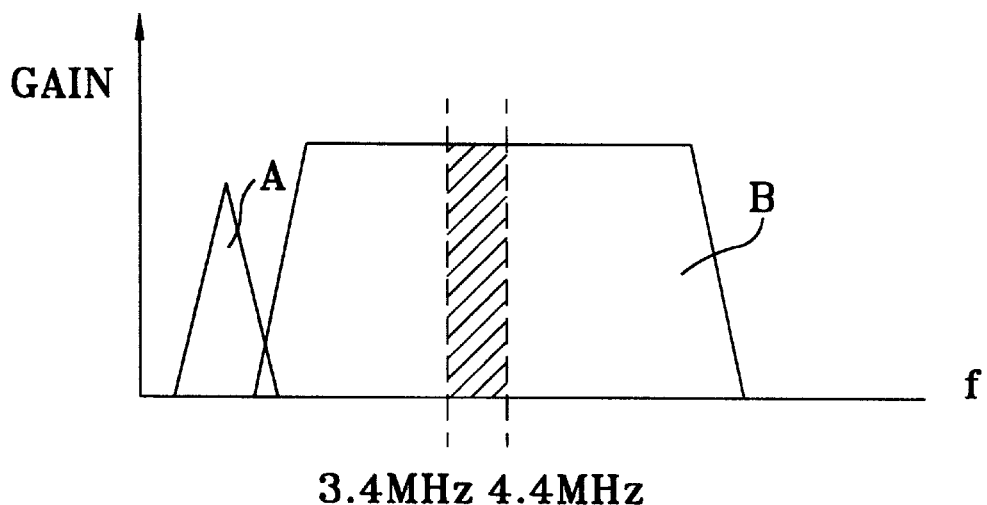
FIGS. 1A and 1B are graphical views for comparing and illustrating FM hands of an S-VHS and an N-VHS.
Figure 1B:
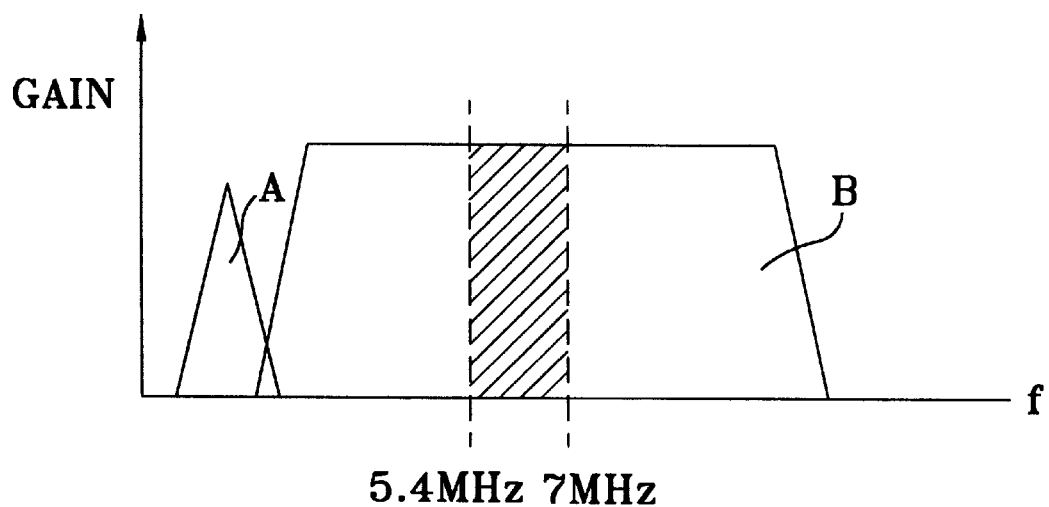

A preferred embodiment of the present invention will be described in detail with reference to the accompanying drawings.

The present invention can provide various types of duplication apparatuses which perform signal duplication between recording mediums of different signal qualities. However, for clarity of explanation an example of a dual deck will be described below.

A dual deck VCR according to the present invention includes deck portions 10 and 20 in which recording and playback operations of a tape are possible. Although the two deck portions can perform recording and playback, a deck in which a source tape is played back is called a source deck portion 10 and the other deck in which tape information applied from the source deck portion 10 is recorded is called a duplicate deck portion 20 since the present invention is directed to duplication technology. The source deck portion 10 and the duplicate deck portion 20 are connected to each other so that both a signal copy and an FM copy are possible. Thus, the source deck portion 10 outputs a demodulated signal for a signal copy and an envelope signal ENV for an FM copy to the duplicate deck portion 20, respectively. The duplicate deck portion 20 includes a video signal processor 22. The video signal processor 22 modulates a reproduced signal applied from the source deck portion 10, in order to record the demodulated signal on the tape. A switch 24 selects one of the modulated signal output from the video signal processor 22 and the FM signal output from the source deck portion 10 according to a control signal of a controller 50. A preamplifier 26 amplifies the signal selected in the switch 24 into a predetermined magnitude. A head 28 records the input signal on the tape. A high picture quality signal amplifier 30 and a high picture quality signal detector 40 are connected to the source deck portion 10, respectively. Here, the high picture quality signal amplifier 30 amplifies a high-band portion on which an FM carrier frequency of S-VHS is loaded, to thereby enable reproduction of the high picture quality signal. Thus, since the high picture quality signal amplifier 30 is an additional portion of a general VCR, the detailed description thereof will be omitted. The high picture quality signal detector 40 outputs a signal according to the detected result of the high picture quality reproduction signal to the controller 50. The controller 50 controls a copy mode of the duplicate deck portion 20 according to the detected result of the high picture quality reproduction signal.

Figure 2:
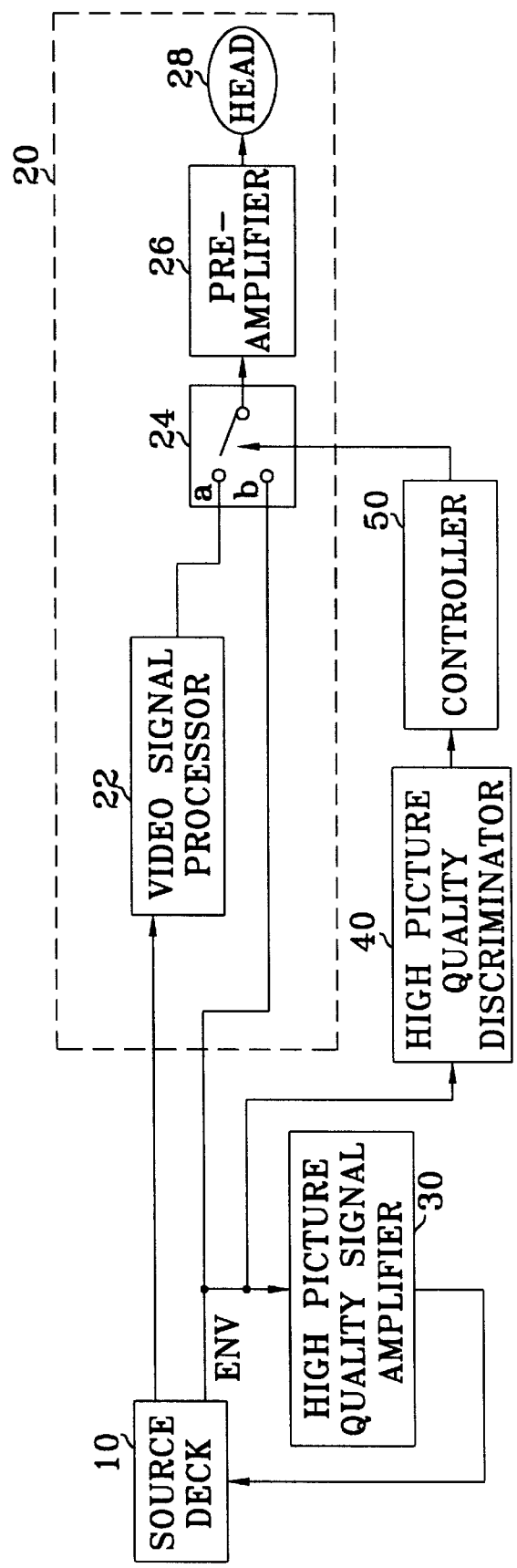
FIG. 2 is a block diagram showing a dual deck VCR having an automatic select function of a copy mode according to a preferred embodiment of the present invention.

FIG. 3 is a detailed block diagram showing the high picture quality signal detector 40 in the apparatus of FIG. 2. The high picture quality signal detector 40 includes a buffer 42 which receives an envelope signal ENV from the source deck portion 10. A peaking portion 44, connected to the rear end of the buffer 42, performs peaking of the envelope signal applied from the buffer 42 into a predetermined frequency and outputs the peaked result. A comparator 48 prestores a reference DC value with respect to peaking of the high picture quality reproduction signal and receives a DC value passed through a smoothing circuit 46, and compares the received DC value with the prestored reference DC value. The comparator 48 outputs a signal indicating whether the high picture quality reproduction signal is detected based on the comparison result, to the controller 50.

The dual deck VCR for automatically selecting a copy mode according to the present invention having the above structure will be described in more detail with reference to FIGS. 2 and 3.

The source deck portion 10 outputs the reproduced signal to the video signal processor 22 of the duplicate deck portion 20. That is, the source deck portion 10 outputs a signal which is amplified by a preamplifier (not shown) and demodulated in a video signal processor (not shown) therein. At the same time, the source deck portion 10 outputs the envelope signal ENV to the switching portion 24 of the duplicate deck portion 20. Meanwhile, the buffer 42 receives the envelope signal ENV and outputs the same to the peaking portion 44. The peaking portion 44 performs peaking of the envelope signal applied from the buffer 42 into a predetermined frequency and outputs the peaked result. The comparator 48 receives a DC value passed through the smoothing circuit 46 and compares the received DC value with the prestored reference DC value. In the result of comparison, when the current DC value is larger than the prestored reference DC value, a high (H) signal indicating that a high picture quality reproduction signal is detected is output to the controller 50, while when the former is smaller than the latter, the high picture quality reproduction signal is not detected, to thus output a low (L) signal to the controller 50. The controller 50 controls the switch 24 according to the high/low (H/L) signal applied from the comparator 48. That is, when the controller 50 receives the high signal from the comparator 48, a control signal is output to the switch 24 so that an output port "a" of the video signal processor 22 is selected. However, when the controller 50 receives the low signal from the comparator 48, a control signal is output to the switch 24 so that an output port "b" of the source deck portion 10 is selected. The signal selected in the switching portion 24 is amplified into a predetermined magnitude in the preamplifier 26 and recorded on a duplicate tape via the head 28.

As described above, the duplication apparatus in accordance with the present invention can automatically determine a signal copy mode based on the quality of a signal recorded on a source recording medium, thereby providing convenience of use.

While only certain embodiments of the invention have been specifically described herein, it will be apparent that numerous modifications may be made thereto without departing from the spirit and scope of the invention.

What is claimed is:

1. A duplication apparatus comprising: a reproduction unit for reproducing a first signal recorded on a loaded first recording medium and signal-processing a reproduced first signal, to output the reproduced first signal and a second signal obtained via signal-processing of the first signal;

a recording unit for selecting one of the first signal and the second signal output from the reproduction unit, and recording the selected signal on a loaded second recording medium; and a control unit for controlling a selecting operation of the recording unit based on the second signal output from the reproduction unit, wherein the control unit controls the recording unit such that the first signal is recorded on the second recording medium when a signal of a first mode is recorded on the first recording medium, and the second signal is recorded on the second recording medium when a signal of a second mode is recorded on the first recording medium.

2. The duplication apparatus according to claim 1, wherein said second recording medium is appropriate for a dedicated reproducer for reproducing a signal of the second mode.

3. The duplication apparatus according to claim 1, wherein said apparatus is used for a video tape.

4. The duplication apparatus according to claim 3, wherein said reproduction unit signal-processes the reproduced first signal to generate an envelope signal of the first signal as the second signal.

5. The duplication apparatus according to claim 4, wherein said control unit comprises:

a quality detector portion for detecting a quality of the first signal using the envelope signal; and a controller for controlling the copy mode of the recording unit based on the quality detected by the quality detector portion.

6. The duplication apparatus according to claim 5, wherein said quality detector portion comprises:

a buffer for receiving the envelope signal;

a peaking portion for peaking the envelope signal output from said buffer into a predetermined frequency band; and a comparator, prestoring a reference direct-current (DC) value related to peaking of the signal of the first mode, for comparing the prestored reference DC value with a DC value of the signal peaked by said peaking portion, to output a first signal indicating that a signal of the first mode is detected to said control unit when the DC value of the peaked signal is larger than the reference DC value, and to output a second signal indicating that the signal of the first mode is not detected to said control unit when the DC value of the peaked signal is smaller than the reference DC value.

* * * * *